(12) United States Patent
Skarohlid

(10) Patent No.: US 6,266,114 B1
(45) Date of Patent: Jul. 24, 2001

(54) METHOD AND APPARATUS FOR COMPENSATING A LIQUID CRYSTAL DISPLAY

(75) Inventor: Mark C. Skarohlid, Cedard Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/353,263

(22) Filed: Jul. 14, 1999

(51) Int. Cl.[7] .................................................. G02F 1/1335
(52) U.S. Cl. ............................................. 349/119; 349/118
(58) Field of Search ...................... 349/117–121

(56) References Cited

U.S. PATENT DOCUMENTS

| | | | |
|---|---|---|---|
| 5,504,603 | 4/1996 | Winker et al. | 359/73 |
| 5,557,434 * | 9/1996 | Winker et al. | 359/73 |
| 5,594,568 | 1/1997 | Abileah et al. | 349/120 |
| 5,638,197 | 6/1997 | Gunning, III et al. | 349/96 |
| 5,895,106 | 4/1999 | VanderPloeg et al. | 349/120 |

OTHER PUBLICATIONS

"Cockpit Displays V: Displays for Defense Applications" by D.B. Taber, L.G. Hale, B. K. Winker, W. J. Gunning, III, M.C. Skarohlid, J.D. Sampica and T.A. Seder, puyblished in vol. 3363 of SPIE as part of the proceedings of a conference held on Apr. 15–17, 1998, in Orlando, Florida by The International Society of Optical Engineering.

* cited by examiner

Primary Examiner—James A. Dudek
Assistant Examiner—Andrew Schechter
(74) Attorney, Agent, or Firm—Nathan O. Jensen; Kyle Eppele; James P. O'Shaughnessy

(57) ABSTRACT

An optical system including an LCD rubbed for a 6 o'clock director orientation, one or more positively uniaxial retarders (A-plates) adjacent to the LCD, and a pair of positive retardance oblique waveplates (O-plates) on TAC substrates adjacent to one another and the input polarizer, all encompassed by a polarizer on each side of the optical stack, aligned for a normally white display.

20 Claims, 1 Drawing Sheet

METHOD AND APPARATUS FOR COMPENSATING A LIQUID CRYSTAL DISPLAY

FIELD OF THE INVENTION

The present invention generally relates to liquid crystal displays (LCDs) and more particularly relates to optically compensated LCDs and even more particularly relates to methods and apparatus of optically compensating LCDs with a combination of optical compensation films.

BACKGROUND OF THE INVENTION

In the past, LCDs have been used in a wide variety of environments, including displays within the cockpit of an aircraft. Avionics applications often impose stringent demands on the optical performance of LCDs. The need for cross-cockpit viewing requires high contrast often extending to a horizon viewing angle range of nearly +60° to –60°. Accommodating pilot height and head movement often requires a vertical field of view having a range extending from –5° and +30° from a normal line from the display surface. Display of high information content imagery, such as weather radar, often requires that the low gray levels be stable in both luminance and chromaticity. This is often difficult, especially at high vertical viewing angles.

Various compensation schemes have been proposed in the past, including those described in U.S. Pat. No. 5,504,603 by Winker et al. and entitled "Optical Compensator For Improved Gray Scale Performance In Liquid Crystal Display", issued on Apr. 2, 1996; U.S. Pat. No. 5,594,568 by Abileah et al. and entitled "LCD With a Pair of Retardation Films on One Side of Normally White Liquid Crystal Layer" issued on Jan. 14, 1997; U.S. Pat. No. 5,638,197 by Gunning, III et al. and entitled "Inorganic Thin Film Compensator For Improved Gray Scale Performance In Twisted Nematic Liquid Crystal Displays and Method of Making" issued on Jun. 10, 1997; U.S. Pat. No. 5,895,106 by Vander-Ploeg et al. and entitled "NW Twisted Nematic LCD With Negative Tilted Retarders on One Side of Liquid Crystal Cell" issued on Apr. 20, 1999, and described in the publication "Cockpit Displays V: Displays for Defense Applications" by D. B. Taber, L. G. Hale, B. K. Winker, W. J. Gunning III, M. C. Skarohlid, J. D. Sampica, and T. A. Seder, published in Volume 3363 of SPIE as part of the proceedings of a conference held on Apr. 15–17, 1998, in Orlando, Fla. by The International Society of Optical Engineering.

While these LCDs may have many advantages in particular uses, they also have significant drawbacks. One common drawback of these designs is the relatively high cost of such compensation systems. The use of proprietary techniques to manufacture some of the components of these LCD systems often leads to relatively high costs.

Consequently, there exists a need for improved methods and apparatuses for compensating LCDs.

SUMMARY OF THE INVENTION

It is an object of the present invention to provide an LCD with high contrast.

It is another object of the present invention to provide an LCD with stable colors at extreme viewing angles.

It is yet another object of the present invention to provide an LCD with improved gray shade stability for low luminance gray scales.

It is a feature of the present invention to utilize a combination of optical compensating films which include a sequence of commercially available components, together with a liquid crystal having predetermined surface orientations.

The present invention is an apparatus and method for optically compensating an LCD which is designed to satisfy the aforementioned needs, provide the previously stated objects, include the above-listed features and achieve the already articulated advantages. The present invention is carried out in a "proprietary component-less" manner in a sense that the inclusion of optical components, which are not generally commercially available, has been greatly reduced.

Accordingly, the present invention is an LCD system including a predetermined sequence and orientation of optical compensation films including two O plates and two A plates.

BRIEF DESCRIPTION OF THE DRAWINGS

The invention may be more fully understood by reading the foregoing description of the preferred embodiments of the invention, in conjunction with the appended drawing wherein:

The FIGURE is a simplified schematic exploded block diagram of the LCD system of the present invention, which includes lines within many of the components which indicate orientation of predetermined optical characteristics of such components.

DETAILED DESCRIPTION

Figure 1:
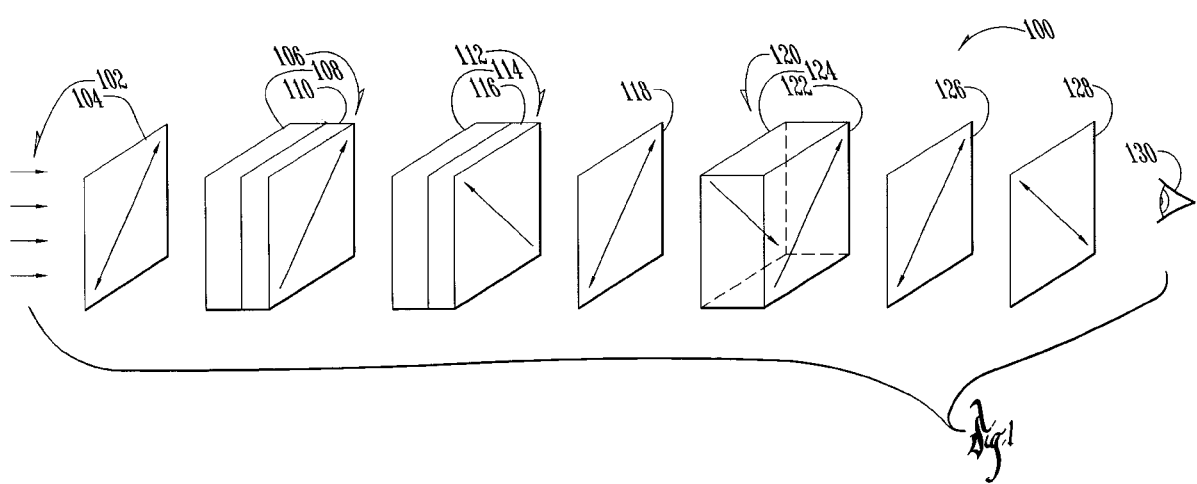

Now referring to the drawing wherein like numerals refer to like matter throughout, there is shown an LCD system of the present invention, generally designated 100. The description herein focuses upon LCD systems used in the cockpit of an aircraft because it is believed that many of the features of the present invention are particularly well suited for use in an aviation environment. However, it should be understood that other environments are equally applicable, and they are intended to be included within the scope of the present invention. LCD system 100 includes a light source 102, which could be any type of light source, such as a back light etc. The light may be collimated, but it is not required for all applications. The light source 102 produces light which is incident upon input polarizer 104, which is any polarizer which is well known in the art. Input polarizer 104 is shown having a line $P_1$, which indicates a polarization absorption axis oriented at approximately 45° from vertical (as measured by the viewer 130 in a clockwise manner). However, a range from 30° to 60° is also contemplated. The polarized light emanating from input polarizer 104 is incident upon first O-plate assembly 106, which includes a first TAC substrate 108 and a first O-plate optical compensation element 110. The first TAC substrate 108 may be located in front of or behind first O-plate optical compensation element 110. First TAC substrate 108 may be a triacetate cellulose substrate, or a substitute which is well known in the art as a substrate for thin films. First O-plate optical compensation element 110 is shown having an optical axis O1 oriented at 45°, but a range of 30° to 60° is also contemplated. First O-plate optical compensation element 110 may be a commercially available retardation film having a retardation range of +70 nm to +140 nm. The optical axis of first O-plate optical compensation element 110 may be inclined with having a uniform or non-uniform tilt angle through the thickness of the film, and the non-uniform tilt angle may vary linearly or non-linearly, with a low tilt angle of 2° to 10° or for high tilt angles from 30° to 60°. The low tilt angle may be facing towards the TAC or away from the TAC.

Throughout this description, any reference to an optical axis being inclined or having a tilt angle shall mean that such optical axis has a component which is out of the plane, which otherwise is referred to herein as including axes oriented in specified directions. First O-plate optical compensation element 110 may be any suitable type of retardation film, such as, but not limited to NH films available from Nippon Petrochemicals, a well-known source of thin film optical components. Light emanating from first O-plate optical compensation element 110 is then incident upon second O-plate assembly 112, which includes second O-plate optical compensation element 116 disposed on second TAC substrate 114. The second TAC substrate 114 may be located in front of or behind second O-plate optical compensation element 116. Second O-plate optical compensation element 116 is shown having an optical axis O2, which is oriented at 135°, but a range of 120° to 150° is also contemplated. Other than having an optical axis which is approximately 90° shifted from the optical axis of first O-plate optical compensation element 110, second O-plate optical compensation element 116 is very similar to first O-plate optical compensation element 110. Light emanating from second O-plate assembly 112 is incident upon first A-plate 118, which is shown having an optical axis of 45°, but a range of 30° to 60° is also contemplated. First A-plate 118 may have a retardation range of +30 nm to +180 nm, with an optical axis inclination of 0° to 10°. First A-plate 118 may be any commercially available A-plate with suitable properties; however, it could include, but is not limited to an A-plate having part number Rpw-80td from Fuji Film, a well-known maker of thin film optical components. Light emanating from first A-plate 118 is incident upon input surface 124 of liquid crystal media 120, which may be any commercially available liquid crystal media available from various sources, which has suitable properties. Liquid crystal media 120 may have a retardation range from +300 nm to +500 nm, with an optical axis orientation of 315° on its input surface 124 and an optical axis orientation of 45° on its output surface 122. Ranges from 300° to 330° and 30° to 60°, respectively are also contemplated. Light which emanates from output surface 122 of liquid crystal media 120 is incident upon second A-plate 126, which may be similar to first A-plate 118. Light emanating from second A-plate 126 is incident upon output polarizer 128 which may be any commercially available polarizer having suitable properties. For a normally white LCD, absorption axis of output polarizer 128 may be oriented at approximately 135°, but a range of 120° to 150° is also contemplated. Other than the optical axis orientations, output polarizer 128 may be very similar to input polarizer 104.

In operation, the apparatus and method of the present invention could function as follows:

A display of information by an LCD device having a predetermined birefringence characteristic is compensated by providing a series of optical retardation films to precondition the light incident upon the LCD device. The preconditioning of the light is accomplished with two O-plates followed by an A-plate. A post LCD compensation step occurs with the use of an A-plate disposed between the LCD and the viewer.

It is thought that the method and apparatus of the present invention will be understood from the foregoing description and that it will be apparent that various changes may be made in the form, construct steps and arrangement of the parts and steps thereof without departing from the spirit and scope of the invention or sacrificing all of their material advantages. The form herein described is merely a preferred exemplary embodiment thereof.

I claim:

1. A display apparatus comprising:
   a first polarizer having a first polarizer absorption axis from 30° to 60° from a predetermined reference;
   a first O-plate, optically in series with said first polarizer, said first O-plate having a first O-plate retardation range from +70 nm to +140 nm, and having a first O-plate optical axis oriented between 30° and 60° from said predetermined reference, said first O-plate having said optical axis inclined with a low tilt at an angle of 2° to 10° and a high tilt angle of 30° to 60°;
   a second O-plate, optically in series with said first O-plate, and having a second O-plate retardation range from +70 nm to +140 nm and a second O-plate optical axis oriented between 120° and 150° from said predetermined reference, said second O-plate optical axis inclined with a low tilt at an angle of 2° to 10° and a high tilt angle of 30° to 60°;
   a first A-plate, optically in series with said second O-plate, said first A-plate having a first A-plate retardation range from +30 nm to +180 nm, a first A-plate optical axis oriented between 30° and 60° from said predetermined reference, and having said optical axis inclined from 0° to 10°;
   a liquid crystal material, optically in series with said first A-plate, said liquid crystal material having a liquid crystal retardation range from +300 nm to +500 nm, a front surface rub angle in a range from 30° to 60°, a back surface rub angle in a range from 285° to 345°; and
   a second polarizer, optically in series with said second liquid crystal material, said second polarizer having an absorption axis of 120° to 150°.

2. A display comprising:
   means for polarizing light from a light source;
   means for compensating light in a range from +70 nm to +140 nm with an optical axis orientation of 30° to 60° from a predetermined reference;
   means for compensating light in a range from +70 nm to +140 nm with an optical axis orientation of 120° to 150° and with an optical axis inclination that varies between a low tilt angle of between 2° to 10°, to a high tilt angle of between 30° and 60°;
   means for compensating light in a range from +30 nm to +180 nm with an optical axis orientation of 30° to 60°;
   means for selectively twisting light in response to an input signal;
   means for compensating light in a range from +30 nm to +180 nm with an optical axis orientation of 30° to 60°; and,
   means for polarizing light that has been compensated.

3. A display comprising:
   a first O-plate optical compensation element;
   a second O-plate optical compensation element, disposed adjacent to said first O-plate optical compensation element;
   a first A-plate, disposed adjacent to said second O-plate optical compensation element; and,
   a liquid crystal media, disposed adjacent to said first A-plate,
   wherein said first O-plate optical compensation element has a first O-plate optical compensation element optical axis oriented at an angle between 30° and 60° from a predetermined reference and further wherein said second O-plate optical compensation element has a second O-plate optical compensation element optical axis oriented between 120° and 150° from said predetermined reference, and said display further includes a second A-plate, disposed adjacent to said liquid crystal media.

4. A display of claim 3 wherein said first O-plate optical compensation element has a first O-plate optical compensation retardation range from +70 nm to +140 nm.

5. A display of claim 4 wherein said second O-plate optical compensation element has a second O-plate optical compensation retardation range from +70 nm to +140 nm.

6. A display of claim 3 wherein said first A-plate has a first A-plate optical axis oriented between 30° and 60° from said predetermined reference.

7. A display of claim 6 wherein said liquid crystal media has an input surface and output surface; and said input surface has a rub angle from 300° to 330°.

8. A display of claim 7 wherein said output surface has a rub angle from 30° to 60°.

9. A display of claim 8 wherein said second A-plate has a second A-plate optical axis oriented at an angle from 30° to 60°.

10. A display of claim 9 further comprising an input polarizer having an input polarizer optical absorption axis oriented from 30° to 60° from said predetermined reference.

11. A display of claim 10 further comprising an output polarizer having an output polarizer optical absorption axis oriented between 120° and 150° from said predetermined reference.

12. A display of claim 5 wherein said first A-plate has a first A-plate retardation range of +30 nm to +180 nm.

13. A display of claim 12 wherein said liquid crystal media has a liquid crystal media retardation range from +300 nm to +500 nm.

14. A display of claim 13 wherein said second A-plate has a second A-plate retardation range from +30 nm to +180 nm.

15. A display of claim 14 further comprising an input polarizer having an input polarizer optical absorption axis oriented between 30° and 60° from said reference.

16. A display of claim 15 further comprising an output polarizer having an output polarizer optical absorption axis oriented between 120° and 150° from said predetermined reference.

17. A method of compensating a liquid crystal display comprising the steps of:
  retarding light from a predetermined source of light in a range of +70 nm to +140 nm with a first compensator with an optical axis oriented between 30° and 60° from a predetermined reference;
  further retarding said light with a second compensator with an optical axis oriented between 120° and 150°;
  further retarding said light, in a range from +30 nm to +180 nm with a third compensator with an optical axis oriented between 30° and 60°;
  selectively twisting said light in response to an input control signal; and,
  further retarding said light, in a range from +30 nm to +180 nm with a fourth compensator having an optical axis oriented between 30° and 60°.

18. A method of claim 17 further comprising the step of polarizing said light before said step of selectively twisting said light and polarizing said light after said step of selectively twisting said light.

19. A method of claim 18 wherein said first compensator has an optical axis inclination that varies from a low tilt angle of between 2° to 10°, to a high tilt angle of between 30° and 60°.

20. A method of claim 18 wherein said first compensator has an optical axis inclination that varies from a high tilt angle of between 30° to 60° to a low tilt angle of between 2° and 10°.

* * * * *